USO11020842B2

(12) United States Patent
Jung et al.

(10) Patent No.: US 11,020,842 B2
(45) Date of Patent: Jun. 1, 2021

(54) JIG ASSEMBLY FOR LASER WELDING

(71) Applicant: LG CHEM, LTD., Seoul (KR)

(72) Inventors: Tai-Jin Jung, Daejeon (KR);
Byoung-Cheon Jeong, Daejeon (KR);
Dal-Mo Kang, Daejeon (KR); Jeong-O Mun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 56 days.

(21) Appl. No.: 16/302,845

(22) PCT Filed: Jan. 5, 2018

(86) PCT No.: PCT/KR2018/000291
§ 371 (c)(1),
(2) Date: Nov. 19, 2018

(87) PCT Pub. No.: WO2018/131843
PCT Pub. Date: Jul. 19, 2018

(65) Prior Publication Data
US 2019/0321945 A1    Oct. 24, 2019

(30) Foreign Application Priority Data

Jan. 11, 2017  (KR) .......................... 10-2017-0004403

(51) Int. Cl.
*B23K 26/02*    (2014.01)
*B23K 26/08*    (2014.01)
(Continued)

(52) U.S. Cl.
CPC .............. *B25B 11/00* (2013.01); *B23K 26/21* (2015.10); *B23K 26/702* (2015.10); *B23K 37/0443* (2013.01); *H01M 2220/20* (2013.01)

(58) Field of Classification Search
CPC ... B25B 11/00; B25B 11/02; B23K 26/02–03; B23K 26/08–0884; B23K 26/702; B23K 37/04–0443
See application file for complete search history.

(56) References Cited

U.S. PATENT DOCUMENTS 4,678,289 A * 7/1987 Mattelin ............. B23K 26/082
                                                     359/226.2
4,870,246 A * 9/1989 Bisiach .................. B23K 26/10
                                                     219/121.78
(Continued)

FOREIGN PATENT DOCUMENTS

CN      201900387 U      7/2011
CN      107824969 A      3/2018
(Continued)

OTHER PUBLICATIONS

International Search Report (with partial translation) and Written Opinion dated May 8, 2018, issued in corresponding International Patent Application No. PCT/KR2018/000291.
(Continued)

*Primary Examiner* — Michael A LaFlame, Jr.
(74) *Attorney, Agent, or Firm* — Morgan, Lewis & Bockius LLP

(57) ABSTRACT

A jig assembly for laser welding includes a jig body having a first penetration portion through which laser light for welding is capable of passing; a contact member connected to the jig body to contact a welding target, the contact member having a second penetration portion through which the laser light passing through the first penetration portion is capable of passing toward the welding target; a tilting unit having a hinge structure to connect the jig body and the contact member to each other; and an elastic member interposed between the jig body and the contact member to
(Continued)

apply an elastic force to provide close contact between the contact member and the welding target.

9 Claims, 8 Drawing Sheets

(51) Int. Cl.
*B23K 37/04* (2006.01)
*B25B 11/00* (2006.01)
*B23K 26/21* (2014.01)
*B23K 26/70* (2014.01)

(56) References Cited

U.S. PATENT DOCUMENTS

| | | | | |
|---|---|---|---|---|
| 4,889,968 | A * | 12/1989 | Miyama | B21D 43/282 219/121.7 |
| 2001/0014108 | A1 * | 8/2001 | Naoe | G02B 26/123 372/29.014 |
| 2004/0079738 | A1 | 4/2004 | Sakamoto et al. | |
| 2009/0207410 | A1 * | 8/2009 | Liu | G02B 7/181 356/399 |
| 2011/0278266 | A1 | 11/2011 | Kobayashi et al. | |
| 2014/0076866 | A1 * | 3/2014 | Gramsch | B23K 26/244 219/121.64 |
| 2015/0179539 | A1 * | 6/2015 | Tamai | H01L 24/32 257/734 |
| 2017/0072494 | A1 * | 3/2017 | Akamatsu | B23K 9/296 |
| 2019/0270157 | A1 * | 9/2019 | Kishikawa | B23K 37/0538 |
| 2020/0030911 | A1 * | 1/2020 | Yao | B23K 26/1462 |
| 2020/0180211 | A1 * | 6/2020 | Kim | C23C 24/106 |

FOREIGN PATENT DOCUMENTS

| | | |
|---|---|---|
| JP | 05-208285 A | 8/1993 |
| KR | 10-0846658 B1 | 7/2008 |
| KR | 10-1105227 B1 | 10/2010 |
| KR | 10-2013-0070392 A | 6/2013 |
| KR | 10-1571210 B1 | 3/2015 |
| KR | 10-2015-0125387 A | 11/2015 |
| KR | 10-2016-0104931 A | 9/2016 |

OTHER PUBLICATIONS

Chinese Office Action dated Mar. 2, 2020 in copending Chinese Patent Application No. 201880002382.8.

* cited by examiner

JIG ASSEMBLY FOR LASER WELDING

TECHNICAL FIELD

The present disclosure relates to a jig assembly for laser welding, and more particularly, to a jig assembly for laser welding, which may perform high-quality laser welding with respect to a welding target such as a plate-shaped cell lead of a secondary battery.

The present application claims priority to Korean Patent Application No. 10-2017-0004403 filed on Jan. 11, 2017 in the Republic of Korea, the disclosures of which are incorporated herein by reference.

BACKGROUND ART

Recently, secondary batteries have been widely used not only in small-sized devices such as portable electronic devices but also in electric vehicles that require a driving power by using an internal combustion engine and/or an electric motor. The electric vehicle includes a hybrid electric vehicle, a plug-in hybrid electric vehicle, and a pure electric vehicle that is powered by an electric motor and a battery only without an internal combustion engine.

When the secondary battery is used in an electric vehicle, a battery module is configured by connecting a large number of secondary batteries in series and/or in parallel in order to increase capacity and power. At this time, pouch-type secondary batteries are frequently used in medium-sized and large-sized devices since they are easily stacked.

In general, the battery module adopts laser welding to electrically connect secondary batteries. For example, as shown in FIG. 1, the stacked secondary batteries 10 are stacked so that cell leads 20 of positive electrodes and negative electrodes are protruded at both ends thereof and the cell leads 20 have opposite polarities alternately. At one side of the stacked secondary batteries 10, the cell leads 20 located at the inner side except for the cell leads 20 located at the outermost sides are bent and overlapped with each other, and then the bent portions of the cell leads 20 are fused by a laser L outputted from a laser generator S. At the other side of the stacked secondary batteries 10, all the cell leads 20 are bent and then the cell leads 20 bent to overlap with each other are fused by the laser L outputted from the laser generator S, thereby completing the electrical connection.

In the conventional battery module, when the cell lead 20 is welded, a laser L of a small spot size is irradiated to one cell lead connection portion P to weld along a longitudinal direction of the cell lead 20, and then the stack of secondary batteries 10 or the laser generator S is moved laterally (along an arrow A) and then the cell lead connection portion is welded. That is, one laser L is irradiated to one cell lead connection portion P for welding.

When laser welding is performed to the cell lead 20, in order to increase the adhesion between welding targets by pressing the welding targets, a laser welding jig as shown in FIG. 2 is used. The laser welding jig includes a jig body 1, a welding surface 2 located at an end of the jig body 1 to contact a surface of the cell lead, and a laser penetration hole 3 formed through the jig body 1 to penetrate the welding surface 2.

However, the laser welding jig has a limitation in correcting the height or flatness of the welding target that is changed due to a cell size variation of the batteries, a module assembly deviation or the like, and thus a gap is generated between the welding surface of the jig and the welding target to cause the welding targets lifted. If lifting occurs between the welding targets, the adhesion between the welding targets is lowered to generate a hole in the welding pattern. Thus, its countermeasures are demanded.

DISCLOSURE

Technical Problem

The present disclosure is designed to solve the problems of the related art, and therefore the present disclosure is directed to providing a jig assembly for laser welding, which has a structure capable of improving the welding quality by maintaining the adhesion between a cell lead and a welding surface even though the height or flatness of cell leads is changed.

The present disclosure is also directed to providing a jig assembly for laser welding, which may compensate for a focal length of the laser corresponding to the height deviation of the cell leads.

Technical Solution

In one aspect of the present disclosure, there is provided a jig assembly for laser welding, comprising: a jig body having a first penetration portion through which a laser for welding is capable of passing; a contact member connected to the jig body to contact a welding target, the contact member having a second penetration portion through which the laser passing through the first penetration portion is capable of passing toward the welding target; a tilting unit having a hinge structure to connect the jig body and the contact member to each other; and an elastic member interposed between the jig body and the contact member to give an elastic force for closely adhering the contact member to the welding target.

The elastic member may be a coil spring whose both ends are respectively coupled to the jig body and the contact member, and the elastic member may be disposed symmetrically based on the tilting unit.

The jig assembly for laser welding according to the present disclosure may further comprise spring guides configured to protrude from a lower surface of the jig body and an upper surface of the contact member, respectively, and inserted into both sides of the coil spring to support the coil spring.

The welding target may be a cell lead, and the first penetration portion formed at the jig body may have an elongated hole structure corresponding to the cell lead.

The tilting unit may be composed of hinge pieces disposed in parallel to each other with a gap formed therebetween through which a laser is capable of passing, and the gap of the tilting unit may communicate with the first penetration portion so that a laser is capable of passing therethrough.

The contact member may be composed of a pair of plates disposed in parallel to each other with a gap formed therebetween, the second penetration portion may be provided by the gap of the contact member, and the gap of the tilting unit may communicate with the second penetration portion so that a laser is capable of passing therethrough.

The jig assembly for laser welding according to the present disclosure may further comprise a displacement sensor disposed to contact an upper surface of the jig body to detect a height deviation of the welding target.

The pair of plates may be provided to be independently tilted.

The pair of plates may have a relatively thin lower portion and a relatively thick upper portion to have a stepped form.

Advantageous Effects

According to the present disclosure, the contact member connected to the jig body may be tilted and elastically adhered to the cell leads. Thus, even though the flatness of the cell leads is changed, the adhesion to the cell leads serving as a welding target may be maintained, thereby preventing a welding defect such as a hole in the welding pattern.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
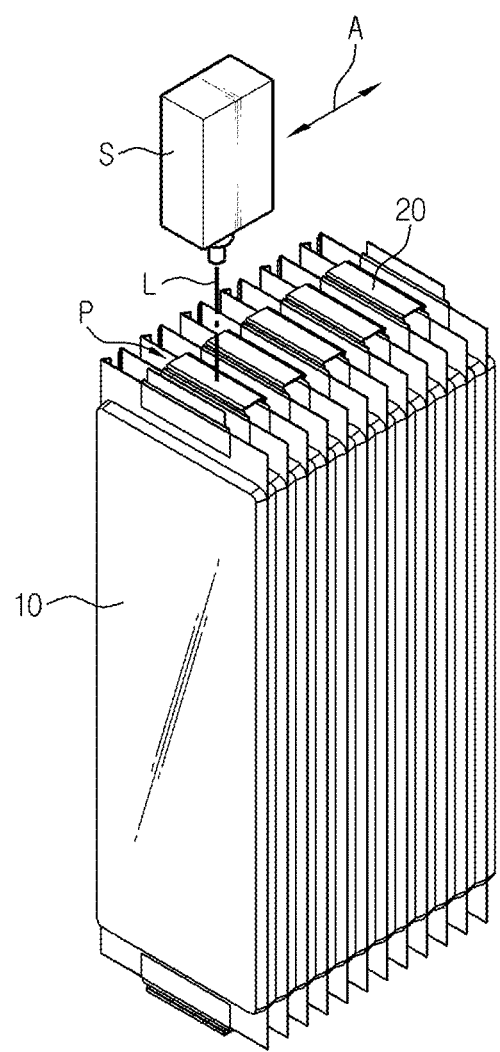
FIG. 1 is a perspective view schematically showing a laser welding process of a general cell lead.
Figure 2:
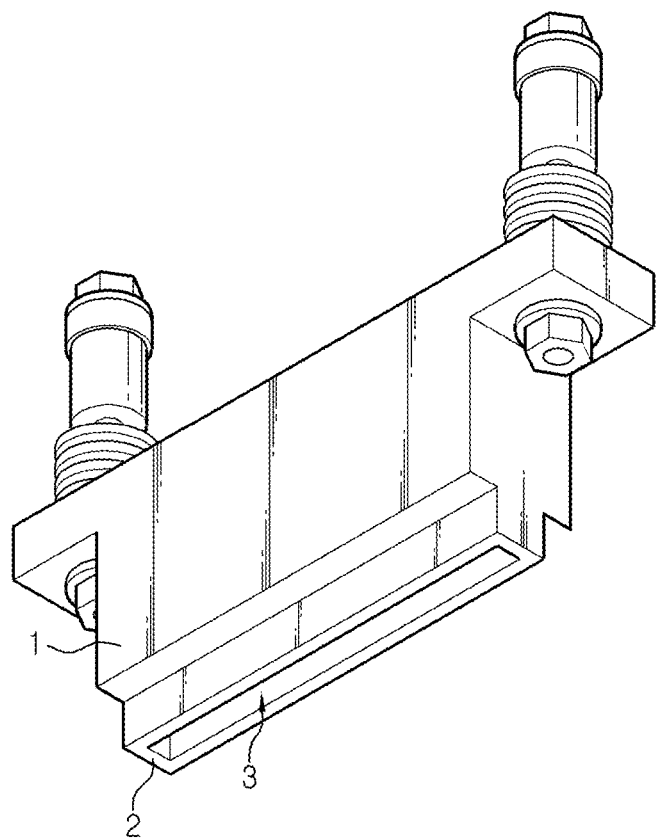
FIG. 2 is a perspective view showing a conventional jig for laser welding.
Figure 3:
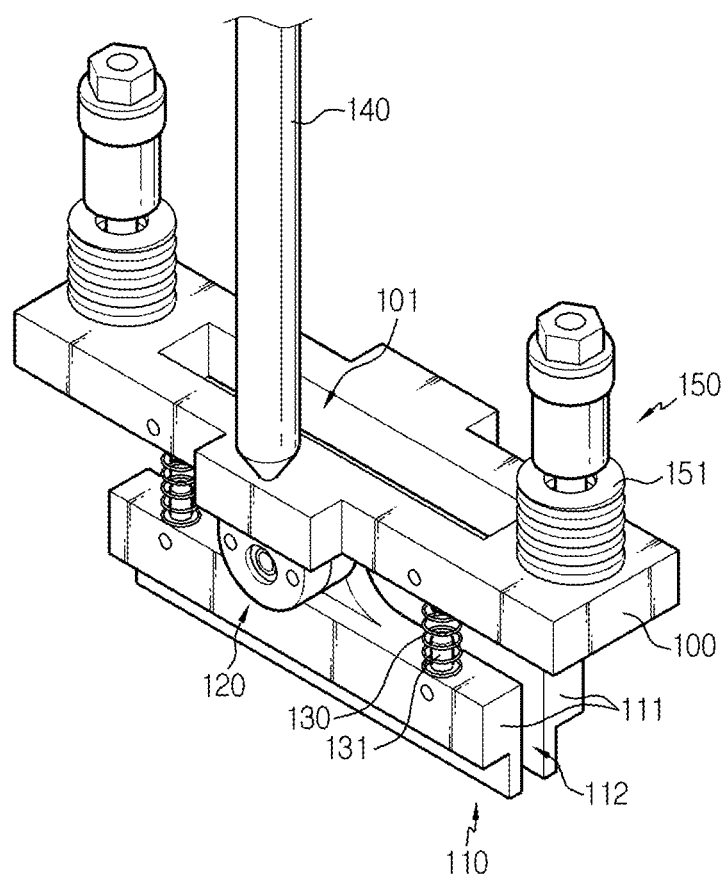
FIG. 3 is a perspective view showing a jig assembly for laser welding according to an embodiment of the present disclosure.
Figure 4:
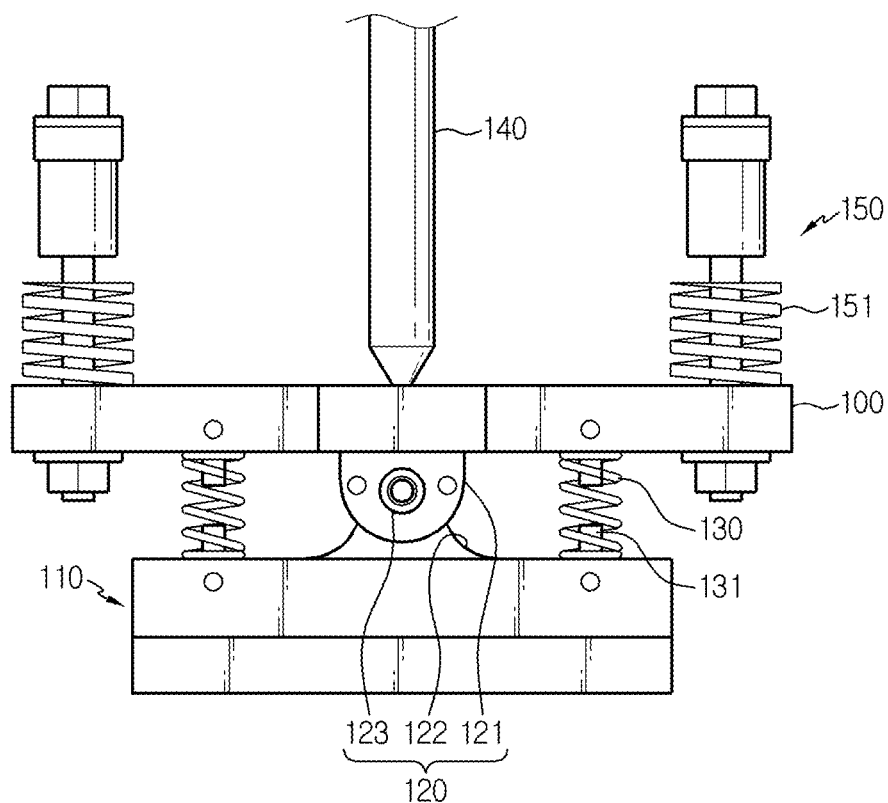
FIG. 4 is a front view of FIG. 3.
Figure 5:
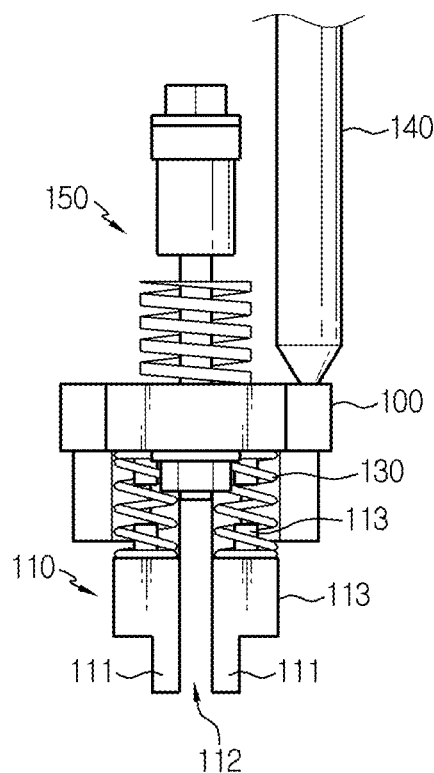
FIG. 5 is a side view of FIG. 3.
Figure 6:
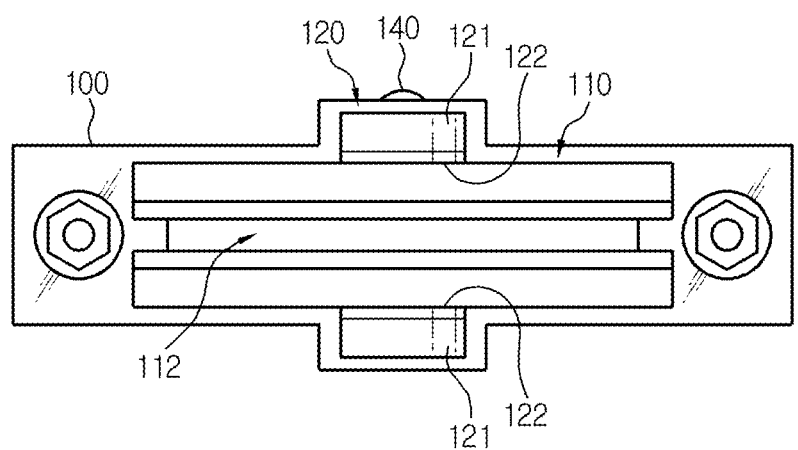
FIG. 6 is a bottom view of FIG. 3.
Figure 7:
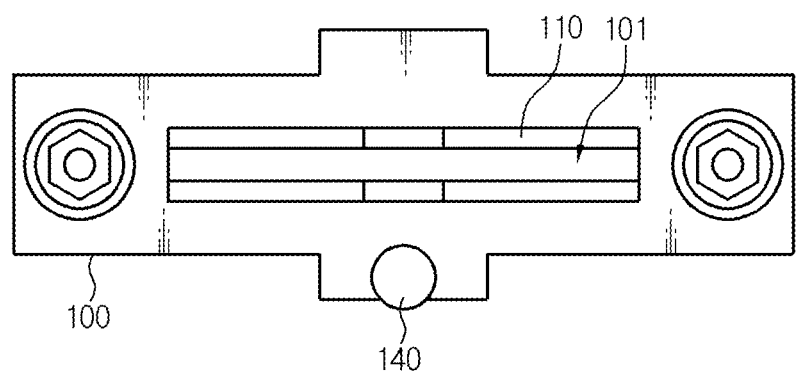
FIG. 7 is a plane view of FIG. 3.

FIG. 3 is a perspective view showing a jig assembly for laser welding according to an embodiment of the present disclosure, FIG. 4 is a front view of FIG. 3, FIG. 5 is a side view of FIG. 3, FIG. 6 is a bottom view of FIG. 3, and FIG. 7 is a plane view of FIG. 3. Referring to FIGS. 3 to 7, a jig assembly for laser welding according to an embodiment of the present disclosure includes a jig body 100, a tilting unit 120 located below the jig body 100 and having a hinge structure, a contact member 110 connected to the jig body 100 by means of the tilting unit 120, and an elastic member 130 interposed between the jig body 100 and the contact member 110.

The jig body 100 is composed of a rectangular metal block with a predetermined thickness. The jig body 100 has a first penetration portion 101 formed in a thickness direction thereof, and support rods 150 capable of being coupled to laser welding equipment are assembled at upper surfaces of both ends thereof in a longitudinal direction. The support rod 150 is preferably screwed and fixed to the jig body 100 in a state of being inserted into a buffering member 151 having a coil spring structure.

The first penetration portion 101 is a portion through which a welding laser for welding the cell leads 20 bent to overlap each other passes, and the first penetration portion 101 is formed by an elongated hole structure elongated in the longitudinal direction of the lead to correspond to the lead of the cell.

The tilting unit 120 has a hinge structure which may connect the jig body 100 and the contact member 110 to each other and tilt the contact member 110 with respect to the jig body 100. The tilting unit 120 performs a tilting function for correcting the height or flatness of a welding target that is changed due to a cell size variation of the battery, a module assembly deviation or the like.

For example, the cell leads 20 may be welded in a state where the ends thereof are bent and overlapped on a metal plate-shaped bus bar (not shown). In this case, if the bus bar is not assembled flatly to the battery module, even though the cell leads 20 are pressed, the cell leads 20 may be lifted from the surface of the bus bar. However, in the present disclosure, the contact member 110 is configured to press the cell leads 20 while being tilted by the tilting unit 120 as much as a slope of the bus bar. Thus, even though the height or flatness of the cell leads 20 with respect to the bus bar is not constant, the cell leads 20 may be more closely adhered to the bus bar.

The tilting unit 120 is configured to allow a laser to pass therethrough so that the laser passing through the first penetration portion 101 may move to a second penetration portion 112. In this consideration, the tilting unit 120 is composed of hinge pieces that are disposed to face each other in parallel with a predetermined gap therebetween. The gap of the tilting unit 120 communicates with the first penetration portion 101 and the second penetration portion 112.

As shown in FIG. 4, the tilting unit 120 is composed of a combination of a first hinge piece 121 extending downward from a lower surface of the jig body 100, a second hinge piece 122 extending upward from an upper surface of the contact member 110, and a shaft 123 serving as a tilting center by connecting the first hinge piece 121 and the second hinge piece 122.

As shown in FIG. 6, the first hinge piece 121 of the tilting unit 120 is provided in a pair so that the pair of first hinge pieces 121 are disposed in parallel with each other with a predetermined gap therebetween. Likewise, the second hinge piece 122 is also provided in a pair so that the pair of the second hinge pieces 122 are disposed in parallel with a predetermined gap therebetween. In addition, the shaft 123 serving as a tilting center is also preferably provided in a pair with a gap therebetween. One of the first hinge piece 121 and the second hinge piece 122 may be located at an inner side of the other. For example, the second hinge piece 122 may be disposed at the inner side of the first hinge piece 121. In this structure, the tilting unit 120 may allow the laser incident through the first penetration portion 101 to pass toward the second penetration portion 112 while providing a tilting function.

In addition, the laser passing through the second penetration portion 112 may be irradiated onto the upper surface of the cell leads 20 closely adhered to the bus bar. During the laser welding, the cell leads 20 may be kept in close contact with the bus bar by the contact member 110.

In the present disclosure, since the laser welding range is guided by the first penetration portion 101 and the second penetration portion 112, the welding position and pattern may be uniform and thus the welding quality may be improved.

The contact member 110 is a member whose front surface is in direct contact with the welding target and is connected to the lower portion of the jig body 100 by the tilting unit 120. The contact member 110 has a second penetration portion 112 having a slit form, which is formed to communicate with the first penetration portion 101 and the gap between of the tilting unit 120 so that the laser passing through the first penetration portion 101 of the jig body 100 may move toward the welding target. The contact member 110 is composed of a pair of plates 111 that are disposed in parallel with the slit, namely the second penetration portion 112, being interposed therebetween.

The pair of plates 111 may be tilted independently. That is, referring to FIGS. 3 to 5, the plate 111 and the tilting unit 120 are spaced apart from each other by a predetermined gap that forms the second penetration portion 120, and are disposed in a pair in parallel.

Thus, each plate 111 may be tilted in association with each tilting unit 120. For example, the rotation direction and slope of one plate 111 and the other plate 111 may be changed according to the rotation direction and angle of one tilting unit 120 and the other tilting unit 120. In the present disclosure, since the pair of pair of plates 111 may be tilted independently relative to each other, the cell leads 20 may be closely adhered, especially even though the bus bar (not shown) is twisted.

Each plate 111 of the contact member 110 is preferably configured to have a stepped form such that its lower portion is relatively thin and its upper portion 113 (see FIG. 5) is relatively thick. According to this structure, the end portion of the contact member 110 where the welding surface is located may be designed to have a slim width suitable for the width of the cell lead 20, and also the upper surface of the contact member 110 may have an area enough to support the elastic member 130, explained later.

The elastic member 130 is interposed between the jig body 100 and the contact member 110 to give an elastic force for close adhesion between the contact member 110 and the cell leads 20 serving as a welding target. If the height or flatness of the welding target is changed, the contact member 110 is tilted to be closely adhered to the surface of the welding target by means of the elastic force applied from the elastic member 130, thereby compensating the deviation from the welding target.

The elastic member 130 is formed of a coil spring, and both ends of the coil spring are coupled and mounted to the jig body 100 and the contact member 110, respectively. The elastic member 130 is disposed symmetrically based the tilting unit 120.

The elastic member 130 is supported by spring guides 131 disposed vertically at a lower portion of the jig body 100 and an upper portion of the contact member 110, respectively. The spring guides 131 protrude from the lower surface of the jig body 100 and the upper surface of the contact member 110, respectively, to face each other and are inserted into both sides of the corresponding elastic member 130 to support the elastic member 130. According to the arrangement of the elastic member 130 and the spring guides 131, even though a slight height deviation occurs at the cell leads 20, an elastic force is applied sensitively to closely adhere the contact member 110 and the cell leads 20 to each other.

A displacement sensor 140 is installed at the upper portion of the jig body 100 to compensate a focal length of the welding laser. A tip of the displacement sensor 140 is disposed vertically to be able to contact the upper surface of the jig body 100, thereby detecting a height deviation of the cell leads 20. The displacement sensor 140 may be implemented using a conventional contact-type linear displacement sensor. If the height or flatness of the cell leads 20 is changed due to a cell size deviation of the battery, a module assembly deviation or the like, the height of the jig body 100 is changed, and the resultant height deviation is detected by the displacement sensor 140 and reflected to a correction process for increasing (or, decreasing) the focal length of the laser.

Figure 8:
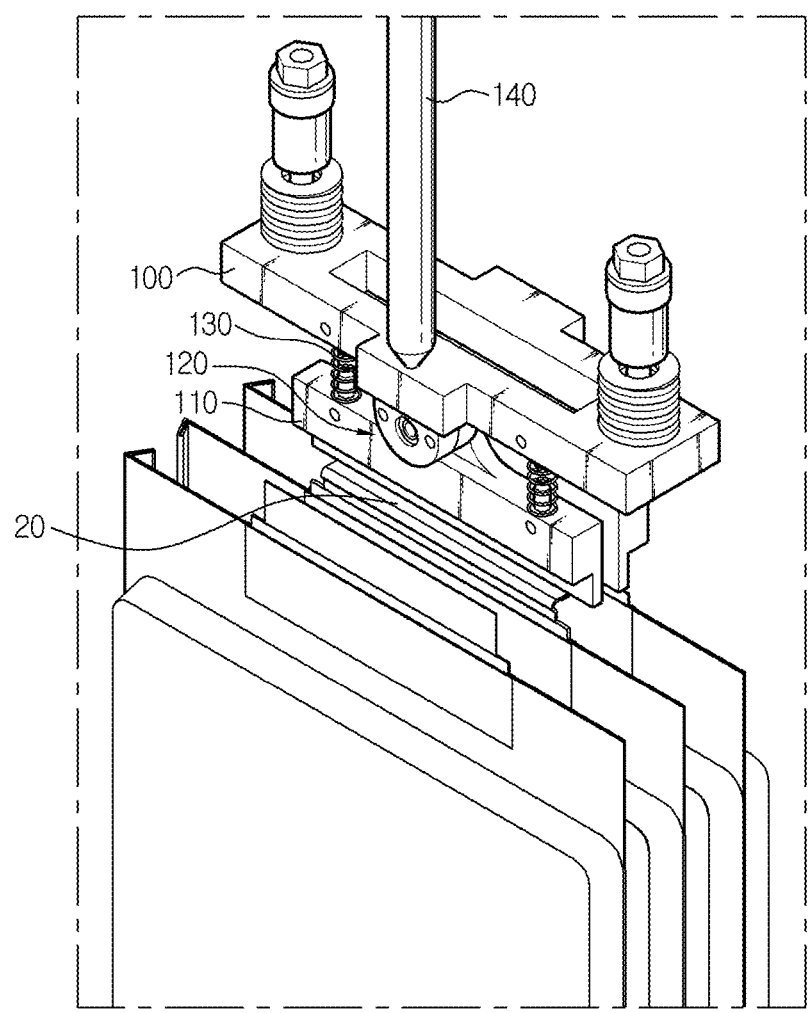
FIGS. 8 and 9 are perspective views showing examples where the jig assembly for laser welding according to an embodiment of the present disclosure is used.
Figure 9:
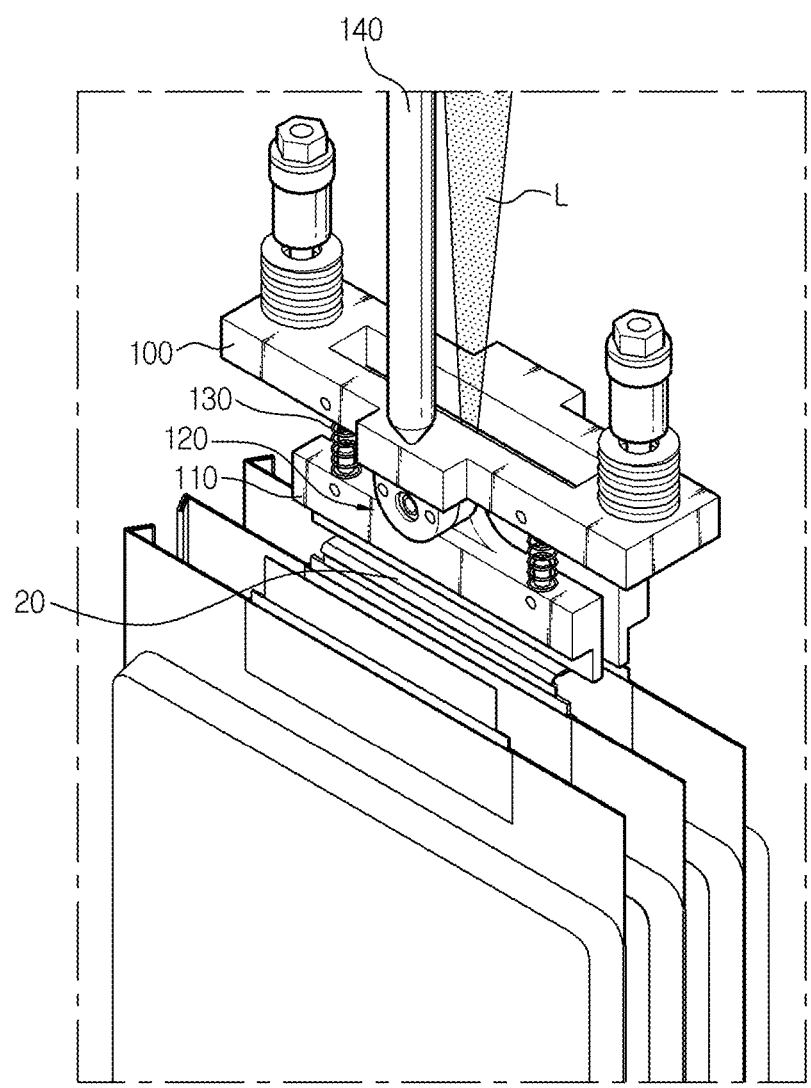

FIGS. 8 and 9 are perspective views showing examples where the jig assembly for laser welding according to an embodiment of the present disclosure is used. As shown in the figures, the jig assembly for laser welding according to an embodiment of the present disclosure may be applied to a laser welding process in which cell leads 20 bent to overlap each other are fused to be electrically connected.

As shown in FIG. 8, in a state where the welding surface of the contact member 110 is closely adhered to the cell leads 20, the displacement sensor 140 is brought into contact with the upper surface of the jig body 100 to measure the height. If a deviation occurs as a result of the height measurement by the displacement sensor 140, the laser welding equipment corrects the focal length of the laser as much as the changed height by reflecting the deviation value.

After that, as shown in FIG. 9, in a state where the cell leads 20 are pressed with the contact member 110, a laser L is irradiated to weld the cell leads 20. At this time, the laser L passes through the first penetration portion 101 of the jig body 100, the gap of the tilting unit 120 and the second penetration portion 112 of the contact member 110 in order, and is irradiated to the cell leads 20 to fuse the cell leads 20.

Since the contact member 110 is capable of being tilted and elastically adhered to the cell leads 20 by the tilting unit 120 and the elastic member 130, the contact member 110 is able to be kept in close contact with the cell leads 20 even though the flatness (angle) of the cell leads 20 is changed, thereby preventing a problem that a hole is generated in the welding pattern.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:
1. A jig assembly for laser welding, comprising:
a jig body having a first penetration portion through which laser light for welding is capable of passing;
a contact member connected to the jig body to contact a welding target, the contact member having a second penetration portion through which the laser light passing through the first penetration portion is capable of passing toward the welding target;
a tilting unit having a hinge structure to connect the jig body and the contact member to each other; and an elastic member interposed between the jig body and the contact member to apply an elastic force to provide close contact between the contact member and the welding target, wherein the contact member includes a pair of plates disposed in parallel to each other with a gap formed therebetween, and wherein the second penetration portion is provided by the gap of the contact member.

2. The jig assembly for laser welding according to claim 1, wherein:

the elastic member is a coil spring having ends respectively coupled to the jig body and the contact member; and the elastic member is symmetrically based on the tilting unit.

3. The jig assembly for laser welding according to claim 2, further comprising spring guides configured to protrude from a lower surface of the jig body and an upper surface of the contact member, respectively, and inserted into both sides of the coil spring to support the coil spring.

4. The jig assembly for laser welding according to claim 1, wherein:

the welding target is a cell lead; and the first penetration portion has an elongated hole structure corresponding to the cell lead.

5. The jig assembly for laser welding according to claim 4, wherein:

the tilting unit includes hinge pieces disposed in parallel to each other with a gap formed therebetween through which a laser is capable of passing; and the gap of the tilting unit communicates with the first penetration portion so that the laser light is capable of passing therethrough.

6. The jig assembly for laser welding according to claim 5, wherein the gap of the tilting unit communicates with the second penetration portion so that laser light is capable of passing therethrough.

7. The jig assembly for laser welding according to claim 1, further comprising a displacement sensor configured to contact an upper surface of the jig body to detect a height deviation of the welding target.

8. The jig assembly for laser welding according to claim 6, wherein the pair of plates are provided to be independently tilted.

9. The jig assembly for laser welding according to claim 6, wherein the pair of plates has a relatively thin lower portion and a relatively thick upper portion to have a stepped form.

* * * * *